United States Patent
Palally (10) Patent No.: US 11,844,030 B2
(45) Date of Patent: Dec. 12, 2023

(54) UPLINK LINK ADAPTATION IN 5G BASE STATIONS

(71) Applicant: Parallel Wireless, Inc., Nashua, NH (US)

(72) Inventor: Hemanth Palally, Bangalore (IN)

(73) Assignee: Parallel Wireless, Inc., Nashua, NH (US)

(*) Notice: Subject to any disclaimer, the term of this patent is extended or adjusted under 35 U.S.C. 154(b) by 9 days.

(21) Appl. No.: 17/221,762

(22) Filed: Apr. 2, 2021

(65) Prior Publication Data

US 2021/0314880 A1 Oct. 7, 2021

Related U.S. Application Data

(60) Provisional application No. 63/004,087, filed on Apr. 2, 2020.

(51) Int. Cl.
*H04W 24/10* (2009.01)
*H04W 52/24* (2009.01)
(Continued)

(52) U.S. Cl.
CPC ........ *H04W 52/245* (2013.01); *H04B 17/318* (2015.01); *H04L 1/0003* (2013.01); *H04W 24/10* (2013.01); *H04W 80/02* (2013.01)

(58) Field of Classification Search
CPC ... H04W 52/245; H04W 24/10; H04W 80/02; H04B 17/318; H04L 1/0003
See application file for complete search history.

(56) References Cited

U.S. PATENT DOCUMENTS 10,278,135 B2    4/2019 Yi et al.
2017/0347270 A1* 11/2017 Iouchi ............... H04L 5/0098
(Continued)

FOREIGN PATENT DOCUMENTS

CN    102348268 A    2/2012
CN    101998605 B    7/2014
(Continued)

*Primary Examiner* — Fahmida S Chowdhury
(74) *Attorney, Agent, or Firm* — Michael Y. Saji; David W. Rouille (57) ABSTRACT

A method for providing uplink link adaptation in 5G base stations is presented. In one embodiment the method includes computing a RSSI of each allocation measuredRSSI(i), including blocks which are unused; computing measurements upon receiving channel allocation and TPC commands from a MAC, the measurements including a revisedWidebandRSSI including a revisedRSSI(i), a lowest relative threshold of each allocation, and a revised RSSI of each allocation after applying TPC commands normalized by the revisedWidebandRSSI; when the revisedWidebandRSSI is greater than a widebandRSSIthreshold, then resetting the TPC commands to be sent to the particular UE and sending a saturation_error_indication message to the MAC; wherein when a revisedRSSInorm(i) for at least one allocation is below the widebandRSSIthreshold, sending the quant_loss_error_indication message to the MAC along with the corresponding index of the allocation; and adapting the MCS and power control information for each of the allocations in the next subframe.

7 Claims, 9 Drawing Sheets

(51) Int. Cl.
*H04L 1/00* (2006.01)
*H04W 80/02* (2009.01)
*H04B 17/318* (2015.01)

(56) References Cited

U.S. PATENT DOCUMENTS

| | | | | |
|---|---|---|---|---|
| 2019/0182840 | A1* | 6/2019 | Feng | H04W 74/0816 |
| 2020/0221494 | A1* | 7/2020 | Nakamura | H04L 5/0094 |
| 2020/0271769 | A1* | 8/2020 | Eschey | G01S 5/0278 |
| 2020/0323031 | A1* | 10/2020 | Nakamura | H04W 80/08 |
| 2020/0351856 | A1* | 11/2020 | Yeo | H04L 27/2607 |
| 2020/0404668 | A1* | 12/2020 | Nakamura | H04L 1/0026 |
| 2021/0288842 | A1* | 9/2021 | Chatterjee | H04W 80/02 |
| 2022/0022208 | A1* | 1/2022 | Nakamura | H04L 27/2662 |
| 2022/0159596 | A1* | 5/2022 | Kim | H04B 17/336 |
| 2022/0272731 | A1* | 8/2022 | Cha | H04J 13/0025 |
| 2022/0386156 | A1* | 12/2022 | Park | H04W 24/10 |

FOREIGN PATENT DOCUMENTS

| | | |
|---|---|---|
| EP | 2645800 B1 | 10/2016 |
| KR | 20110036492 A | 7/2016 |
| WO | 2015018348 A1 | 2/2015 |
| WO | 2015034299 A1 | 3/2015 |

* cited by examiner

UPLINK LINK ADAPTATION IN 5G BASE STATIONS

CROSS-REFERENCE TO RELATED APPLICATIONS

This application claims priority under 35 U.S.C. § 119(e) to U.S. Provisional Pat. App. No. 63/004,087, filed Apr. 2, 2020, titled "Uplink Link Adaptation in 5G Base Stations" which is hereby incorporated by reference in its entirety for all purposes. The present application hereby incorporates by reference each of U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes. This application also hereby incorporates by reference in their entirety each of the following U.S. Pat. applications or Pat. App. Publications: US20150098387A1; US20170055186A1; US20170273134A1; US20170272330A1; and Ser. No. 15/713,584. This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019.

BACKGROUND

Uplink Power Control Mechanism in 5G-NR: The MAC layer is responsible for allocation of uplink physical resources (Resource Blocks) to UE. The MAC also decides the MCS (Modulation and Coding Scheme) and the transmission power used by each UE.

The MAC determines the uplink allocation parameters based on the channel quality measurements provided by Physical layer for each of the uplink channel allocations. A common measurement used is CQI (Channel Quality Indicator). CQI is computed by Physical layer using the DMRS reference signals. CQI is a function of the SINR of the uplink received signal post ADC (Analog to digital Conversion).

The CQI requirement is higher in 5G-NR due to introduction of higher modulation schemes like 256-QAM. If the measured CQI of a given channel allocation is lesser than the CQI required for achieving the desired BLER for the MCS used, MAC indicates the UE to rise its power using the uplink TPC (transmit power control) commands.

SUMMARY

A method is disclosed to adapt the uplink power and Modulation and Coding schemes (MCS) for each UE. This method considers a holistic knowledge of the carrier wide power distribution in the uplink to choose the MCS schemes for optimal over all throughput. The method also helps to avoid severe degradation in uplink performance due to effects of saturation and quantization loss.

In one embodiment a method for providing uplink link adaptation in 5G base stations is disclosed. The method includes computing, by a Physical Layer (PHY), a Received Signal Strength Indicator (RSSI) of each allocation including blocks which are unused; computing measurements upon receiving channel allocation and Transmission Power Control (TPC) commands from a Media Access Control (MAC), the measurements including a first factor including a second factor, a third factor and a fourth factor; wherein when the fourth factor is greater than a threshold, then resetting, by the PHY, the TPC commands to be sent to the particular UE and sends a first error message to the MAC; wherein when the second factor for at least one allocation is below the threshold, sending, by the PHY, a second error message to the MAC along with the corresponding index of the allocation; and upon receiving of the indications from the PHY, adapting, by the MAC, the MCS and power control information for each of the allocations in the next subframe.

In another embodiment method includes computing, by a Physical Layer (PHY), a Received Signal Strength Indicator (RSSI) of each allocation measuredRSSI(i), including blocks which are unused; computing measurements upon receiving channel allocation and Transmission Power Control (TPC) commands from a Media Access Control (MAC), the measurements including a revisedWidebandRSSI including a revisedRSSI(i), a lowest relative threshold of each allocation, and a revised RSSI of each allocation after applying the TPC commands normalized by the revisedWidebandRSSI; wherein when the revisedWidebandRSSI is greater than a widebandRSSIthreshold, then resetting, by the PHY, the TPC commands to be sent to the particular UE and sends a saturation_error_indication message to the MAC; wherein when a revisedRSSInorm(i) for at least one allocation is below the widebandRSSIthreshold, sending, by the PHY, the quant_loss_error_indication message to the MAC along with the corresponding index of the allocation; and upon receiving of the indications from the PHY, adapting, by the MAC, the MCS and power control information for each of the allocations in the next subframe.

In another embodiment a method for computing RSSI is disclosed. The method includes computing a power of each Resource Block (RB) in a given symbol separately for all the Orthogonal Frequency division Multiplexing (OFDM) symbols in a subframe and for each antenna; averaging a first value across all the symbols in a subframe for each antenna to get a second value; and wherein a Wideband RSSI is obtained by averaging across all RBs.

In another embodiment a method for computing RSSI is disclosed. The method includes computing a power of each Resource Block (RB) in a given symbol separately for all the Orthogonal Frequency division Multiplexing (OFDM) symbols in a subframe and for each antenna; averaging a RssiPerRB across all the symbols in a subframe for each antenna to get RssiperRBperSF[rbIndex]; and wherein a Wideband RSSI is obtained by averaging across all RBs.

DETAILED DESCRIPTION

Figure 1:
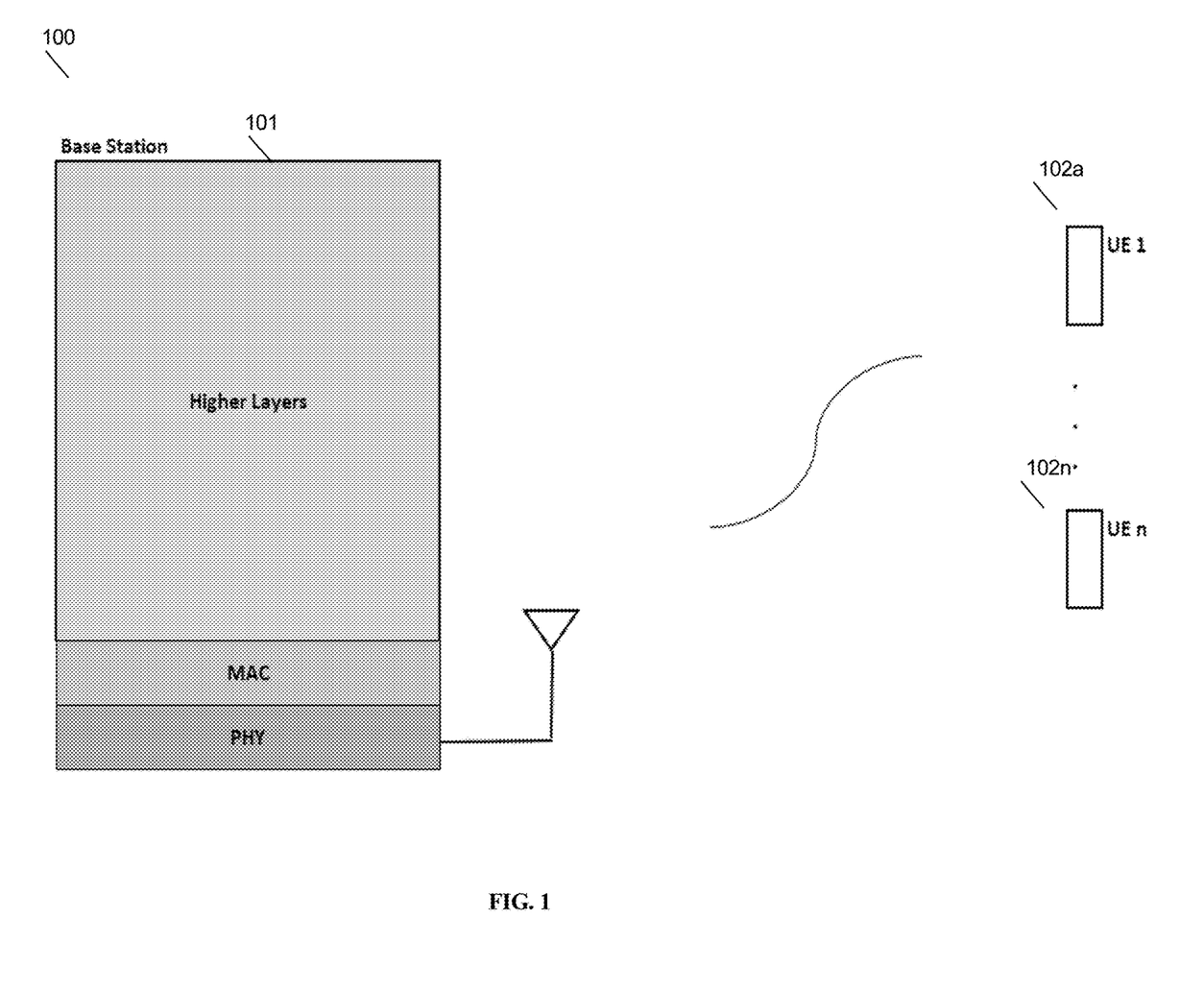
FIG. 1 is a system diagram showing a base station and UEs, in accordance with some embodiments.

FIG. 1 shows a system 100 for providing uplink link adaptation in 5G base stations. System 100 includes a base station 101 and one or more User Equipments (UE) 102a-102n.

Figure 2:
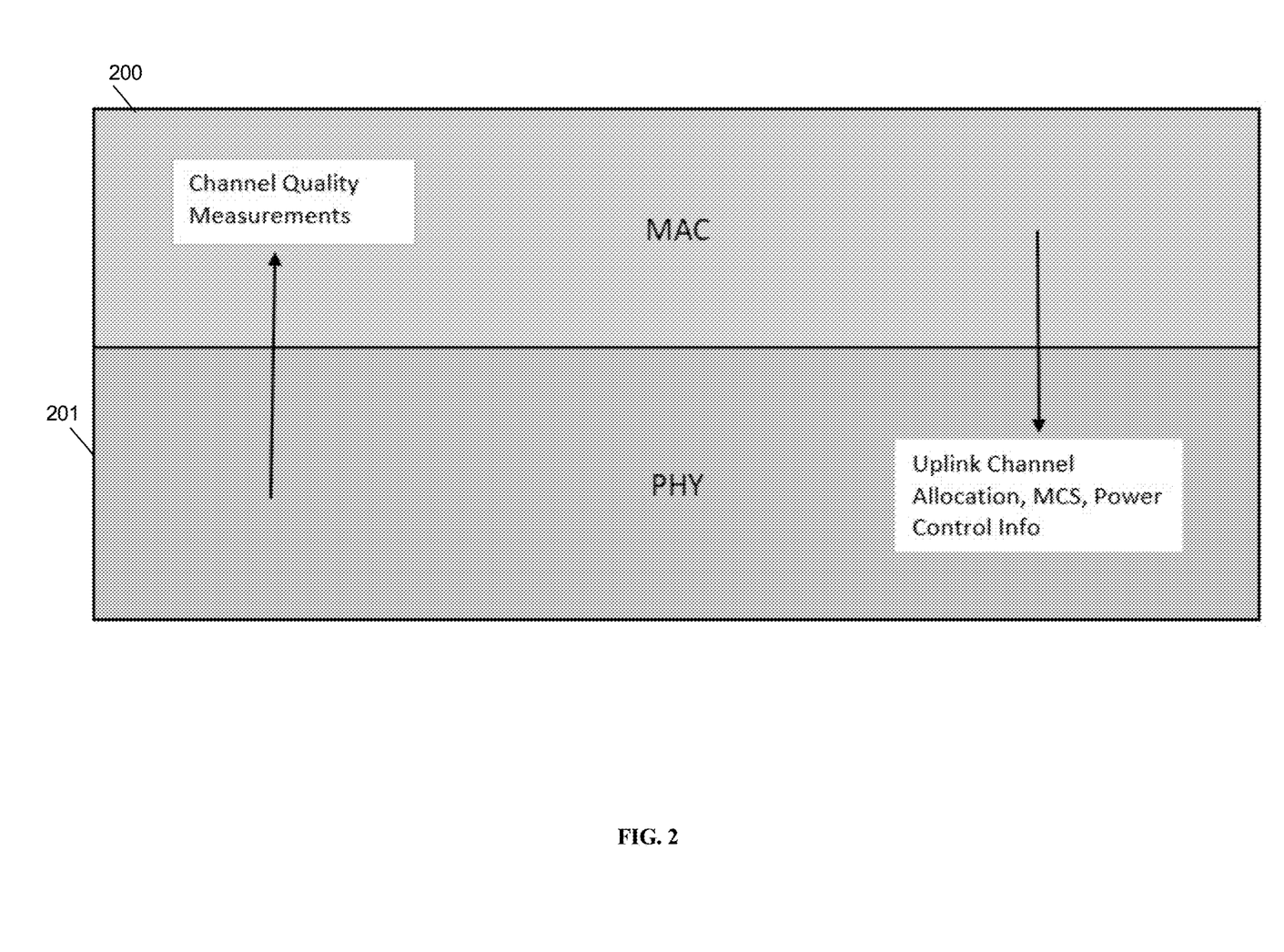
FIG. 2 is a diagram showing a PHY and MAC of a base station and UEs, in accordance with some embodiments.

FIG. 2 shows the MAC 200 and PHY 201 of a base station. Channel quality measurements are communicated by the PHY to the MAC. Uplink channel allocation, MCS, and power control information are communicated by the MAC to the PHY. Allocation of power based on the CQI alone for a given MCS scheme can lead to the following problems under certain conditions. If the overall (wideband) RSSI (Received Signal Strength Indicator) rises beyond certain threshold can lead to saturation of the received timed domain waveform. This is severe problem and will degrade the performance of all the uplink channels in a given subframe. If the RSSI of a particular allocation rises disproportionately with respect to other allocations, some allocations may operate under very low RSSI and this same lead to severe performance degradation due to quantization loss. This problem is aggravated in 5G NR due to the use of high power UEs (power class 2)

Figure 3:
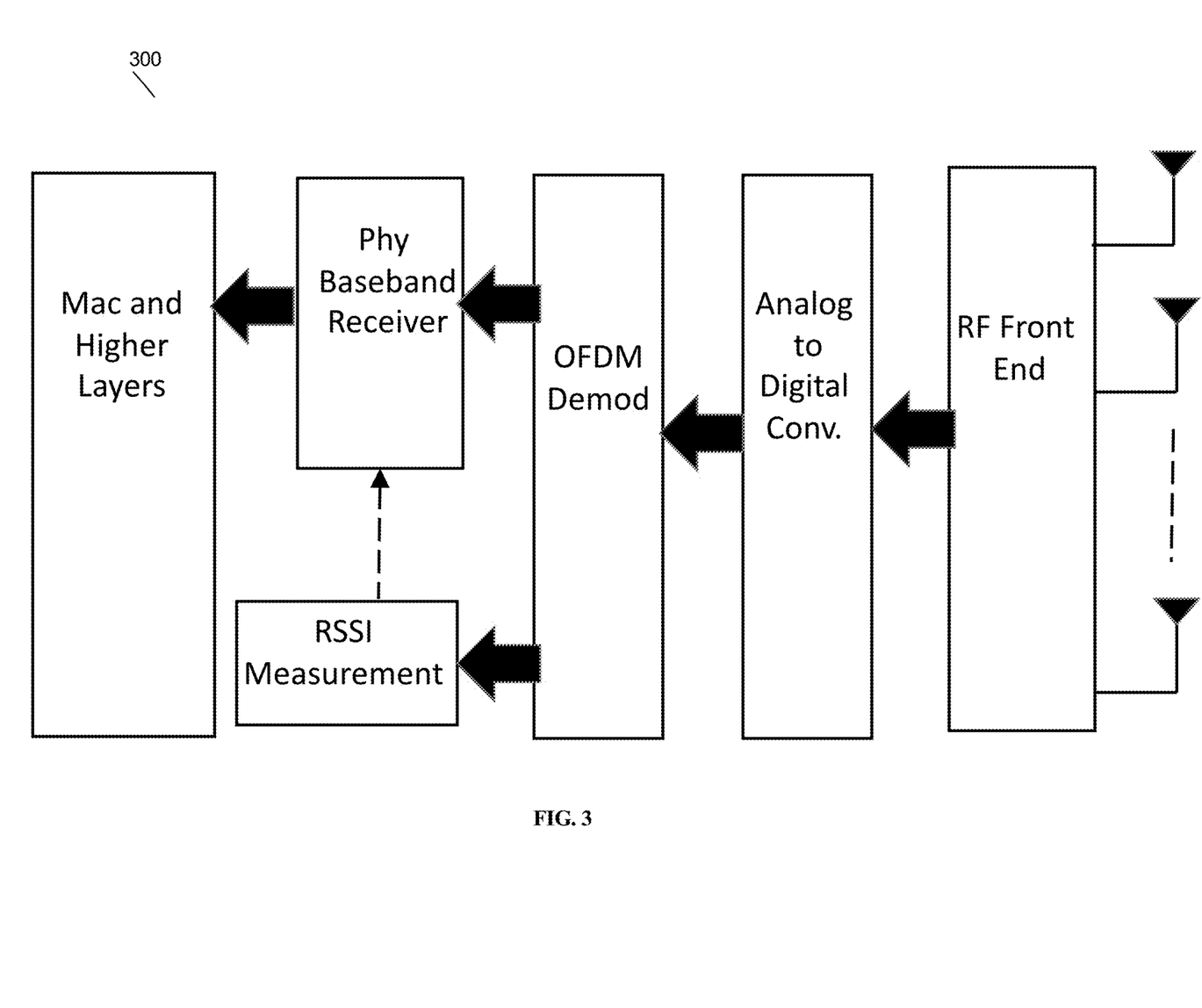
FIG. 3 is a system diagram showing a system for performing link adaptation in 5G base stations, in accordance with some embodiments.

FIG. 3 shows system processing blocks 300 used for providing uplink adaptation in 5G base stations. These include an RF front end receiving signals on one or more antennas and communicating with an Analog to Digital Converter (ADC) circuit. The ADC circuit is in communication with an OFDM demodulation circuit. The OFDM circuit is in communication with an RSSI circuit, and both of the OFDM and RSSI circuit are in communication with a PHY baseband receiver. The PHY baseband receiver is in communication with the PHY and MAC layers.

The method disclosed avoids the abovementioned degradations by considering the holistic distribution of the received power across all allocations and thereby helps to achieve optimal performance.

Figure 4:
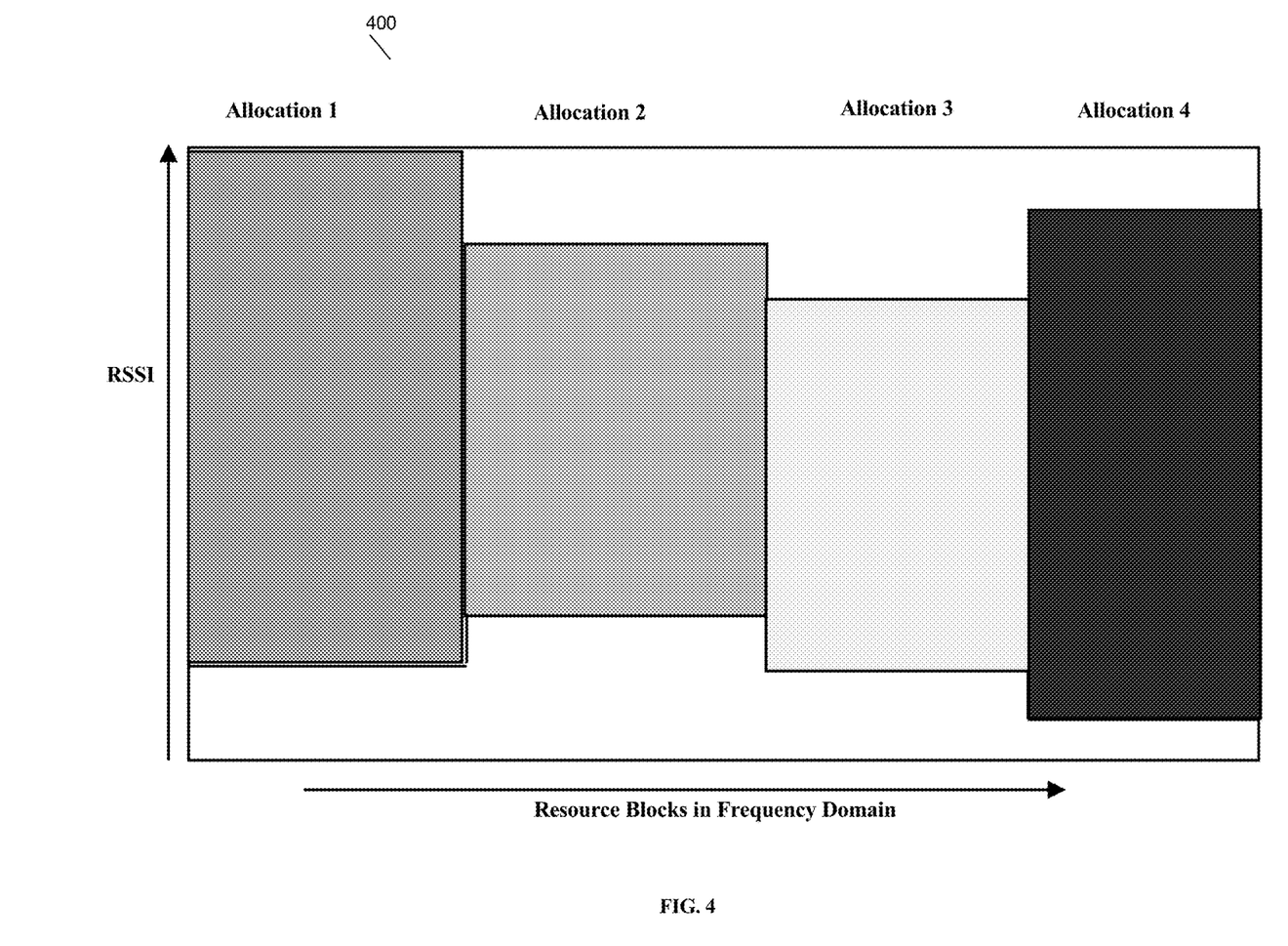
FIG. 4 is a graph showing RSSI versus resource blocks, in accordance with some embodiments.

FIG. 4 shows the distribution of RSSI for four allocations across the system Bandwidth. The interference is shown in grey and the desired signal level is shown in other colors.

Figure 5:
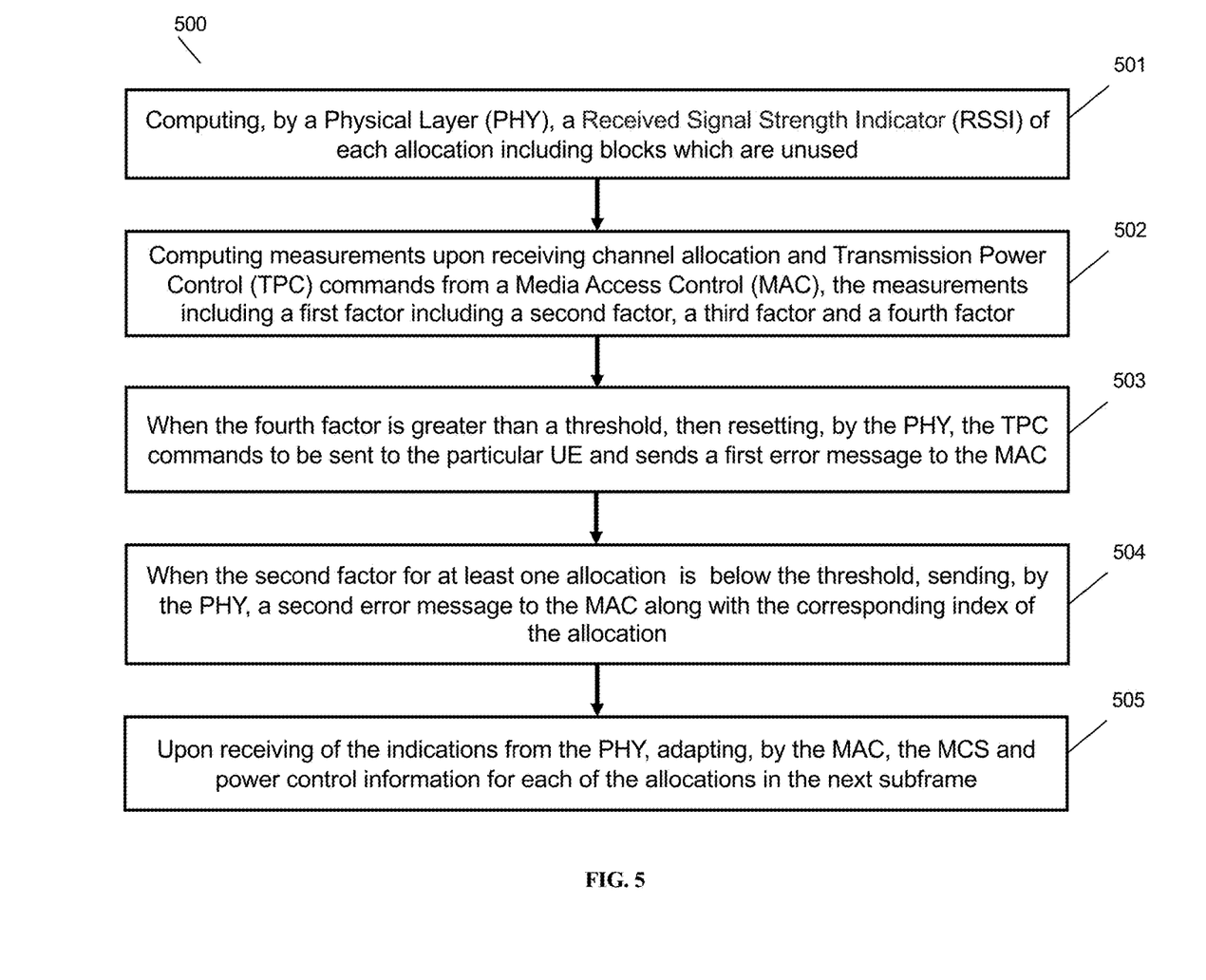
FIG. 5 is a flow diagram for one embodiment of a method for providing uplink link adaptation in 5G base stations, in accordance with some embodiments.

FIG. 5 is a flow diagram of an example embodiment of a method 500. Method 500 begins with processing block 501 which discloses computing, by a Physical Layer (PHY), a Received Signal Strength indicator (RSSI) of each allocation including blocks which are unused.

Processing block 502 shows computing measurements upon receiving channel allocation and Transmission Power Control (TPC) commands from a Media Access Control (MAC), the measurements including a first factor including a second factor, a third factor and a fourth factor. In one embodiment the first factor comprises a revisedWidebandRSSI, the second factor comprises a revisedRSSI(i), the third factor comprises a lowest relative threshold of each allocation, and the fourth factor comprises a revised RSSI of each allocation after applying the TPC commands normalized by the first factor.

In processing block 503, when the fourth factor is greater than a threshold, then resetting, by the PHY, the TPC commands to be sent to the particular UE and sends a first error message to the MAC.

In processing block 504, when the second factor for at least one allocation is below the threshold, sending, by the PHY, a second error message to the MAC along with the corresponding index of the allocation.

Processing block 505 recites upon receiving of the indications from the PHY, adapting, by the MAC, the MCS and power control information for each of the allocations in the next subframe.

In a particular embodiment, the PHY computes the RSSI of each allocation measuredRSSI(i), including the blocks which are unused. The unused blocks will contain only the power contribution from the interference. The details of RSSI calculations are described below.

Upon receiving of the channel allocation and TPC commands from MAC, PHY computes the following measurements:

a.

$$revisedWidebandRSSI = \sum_{i=1}^{n} revisedRSSI(i)$$

$$revisedRSSI(i) = measuredRSSI(i) + powerDiff(i)$$

where n is the total number of blocks including the unused blocks. powerDiff is a function of the TPC commands given by MAC for a given allocation b. The lowest relative threshold of each allocation: This threshold is a function of modulation scheme used for the allocation, bit width of the ADC used, and the fixed-point implementation of the algorithms used in the PHY receiver chain. A table shall be maintained for these combinations based on the empirical results.

c. Revised RSSI of each allocation after applying TPC commands normalized by revisedWidebandRSSI $$revisedRSSInorm(i) = \frac{revisedRSSI(i)}{revisedWidebanRSSI}$$

If the revisedWidebandRSSI is greater than widebandRSSIthreshold, then PHY will reset the TPC commands to be sent to that particular UE and sends saturation_error_indication message to MAC. The interface between PHY and MAC is not defined by the 3GPP specifications and is proprietary to the base station manufacturer. So, the interface can be modified to pass this indication to MAC $$widebandRSSIthreshold = a*2^{2(q-1)}$$

where, α is a scale factor between 0.8 to 1
q is the ADC bit width

If revisedRSSInorm(i) for at least one allocation is below the threshold mentioned in b, PHY sends the quant_loss_error_indication message to MAC along with the corresponding index of the allocation.

Upon receiving of the indications from PHY based on 4 or 5, MAC will adapt the MCS and power control information for each of the allocations in the next subframe.

RSSI Computations

In order to reduce the need for large buffers to store the entire subframe worth of subcarriers, the RSSI computation is done in staggered manner as below. The buffer size required would be only for storing one symbol worth of subcarriers.

This method also does average over small chunks and thereby reduces the loss of precision that can happen due to large divisions in limited bit width arithmetic.

Figure 6:
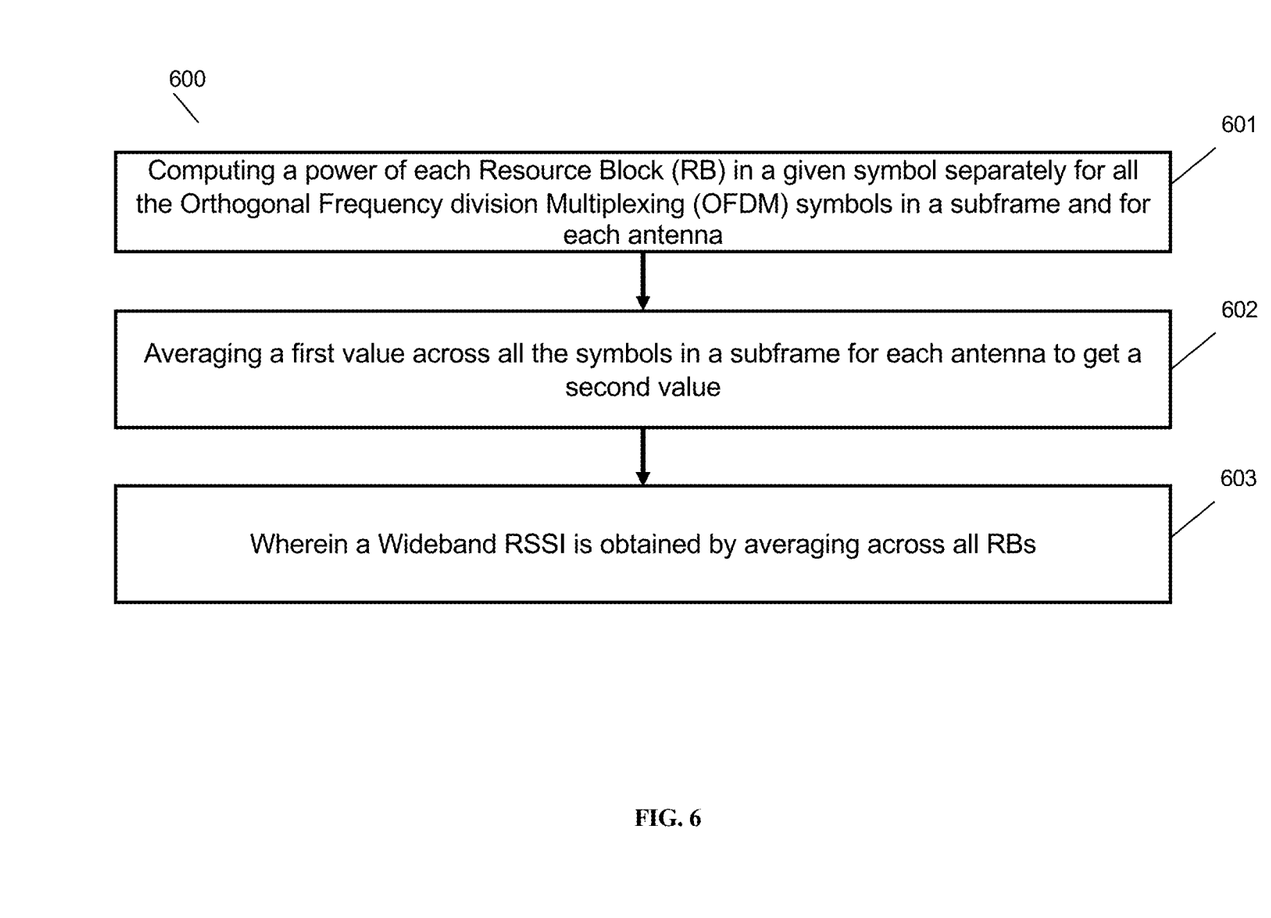
FIG. 6 is a flow diagram for one embodiment of a method for computing Received Signal Strength Indicator (RSSI), in accordance with some embodiments.

FIG. 6 is a flow diagram of one embodiment of a method 600 for computing Received Signal Strength Indicator (RSSI). The method 600 begins with processing block 601 which recites computing a power of each Resource Block (RB) in a given symbol separately for all the Orthogonal Frequency division Multiplexing (OFDM) symbols in a subframe and for each antenna.

Processing block 602 shows averaging a first value across all the symbols in a subframe for each antenna to get a second value. Processing block 603 recites wherein a Wideband RSSI is obtained by averaging across all RBs.

In a particular embodiment, compute the power of each RB in a given symbol separately for all the OFDM symbols in a subframe and for each Antenna Rssi_PerRB[rbIndex][symbolIndex][AntennaIndex]

Where, rbIndex=1 to number of uplink RBs in the system bandwidth, NuIRB symbolIndex=1 to number of OFDM symbols in a subframe, NsymbSF AntennaIndex=1 to Number of receive Antennas, numRxAnts Average the RssiPerRB across all the symbols in a subframe for each antenna to get $$RssiperRBperSF[rbIndex] = \frac{1}{(numRxAnts + NsymSF)}$$

$$\sum_{AntennaIndex=1}^{numRxAnts} \sum_{symbolIndex=1}^{N_{sym}SF} Rssi_{PerRB[rbIndex][symbolIndex][AntennaIndex]}$$

1. Wideband RSSI is obtained by averaging across all RBs $$WidebandRSSI = \frac{1}{NuIRB} \sum_{rbIndex=1}^{NuIRB} RssiperRBperSF[rbIndex]$$

Figure 7:
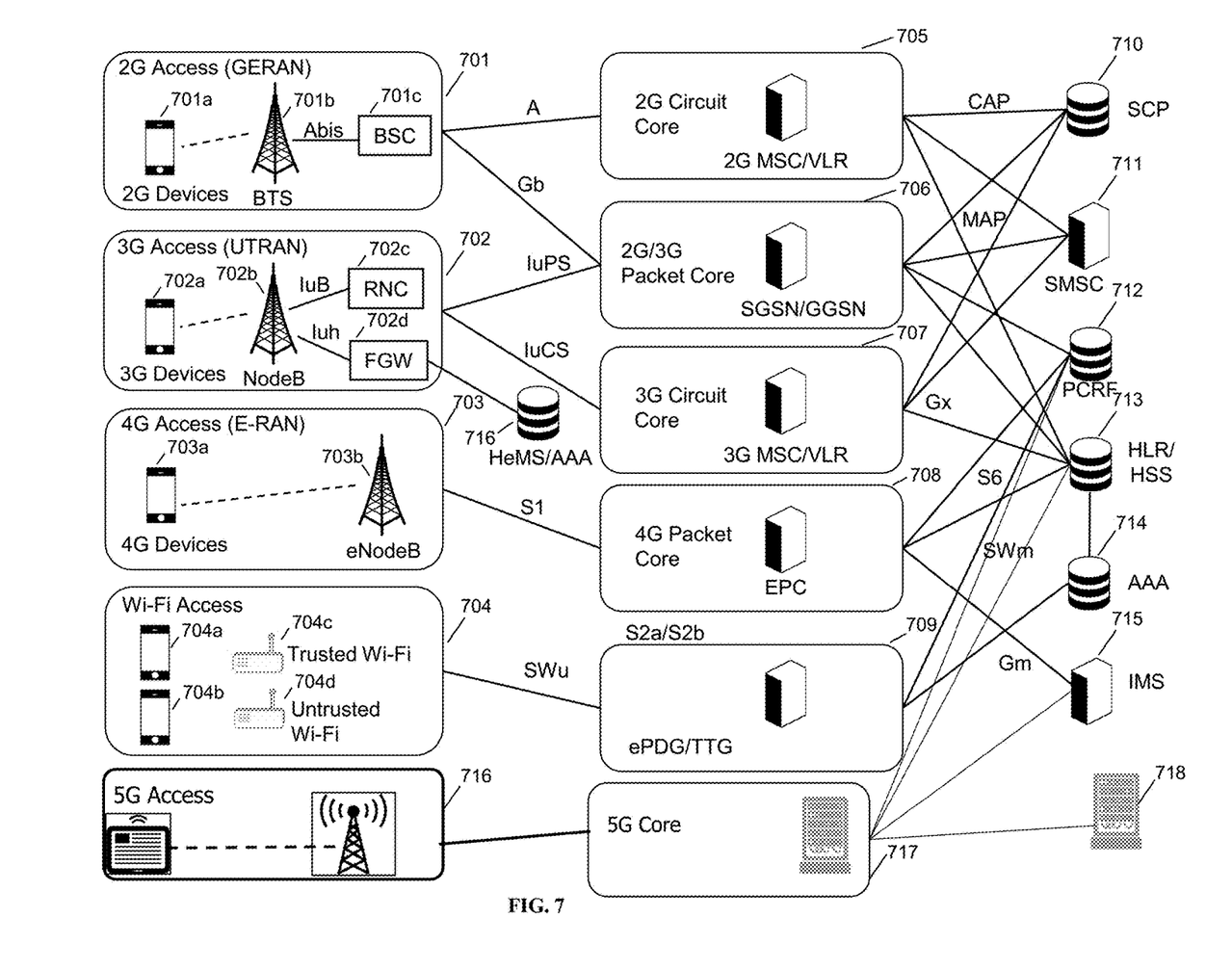
FIG. 7 is a schematic network architecture diagram for various radio access technology core networks.

FIG. 7 is a schematic network architecture diagram for 3G and other-G prior art networks. The diagram shows a plurality of "Gs," including 2G, 3G, 4G, 5G and Wi-Fi. 2G is represented by GERAN 101, which includes a 2G device 501*a*, BTS 701*b*, and BSC 701*c*. 3G is represented by UTRAN 702, which includes a 3G UE 702*a*, nodeB 702*b*, RNC 702*c*, and femto gateway (FGW, which in 3GPP namespace is also known as a Home nodeB Gateway or HNBGW) 702*d*. 4G is represented by EUTRAN or E-RAN 703, which includes an LTE UE 703*a* and LTE eNodeB 703*b*. Wi-Fi is represented by Wi-Fi access network 704, which includes a trusted Wi-Fi access point 704*c* and an untrusted Wi-Fi access point 704*d*. The Wi-Fi devices 704*a* and 704*b* may access either AP 704*c* or 704*d*. In the current network architecture, each "G" has a core network. 2G circuit core network 705 includes a 2G MSC/VLR; 2G/3G packet core network 706 includes an SGSN/GGSN (for EDGE or UMTS packet traffic); 3G circuit core 707 includes a 3G MSC/VLR; 4G circuit core 708 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 730, the SMSC 731, PCRF 732, HLR/HSS 733, Authentication, Authorization, and Accounting server (AAA) 734, and IP Multimedia Subsystem (IMS) 735. An HeMS/AAA 736 is present in some cases for use by the 3G UTRAN. The diagram is used to indicate schematically the basic functions of each network as known to one of skill in the art, and is not intended to be exhaustive. For example, 7G core 717 is shown using a single interface to 7G access 716, although in some cases 7G access can be supported using dual connectivity or via a non-standalone deployment architecture.

Noteworthy is that the RANs 701, 702, 703, 704 and 736 rely on specialized core networks 705, 706, 707, 708, 709, 737 but share essential management databases 730, 731, 732, 733, 734, 735, 738. More specifically, for the 2G GERAN, a BSC 701*c* is required for Abis compatibility with BTS 701*b*, while for the 3G UTRAN, an RNC 702*c* is required for Iub compatibility and an FGW 702*d* is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 8:
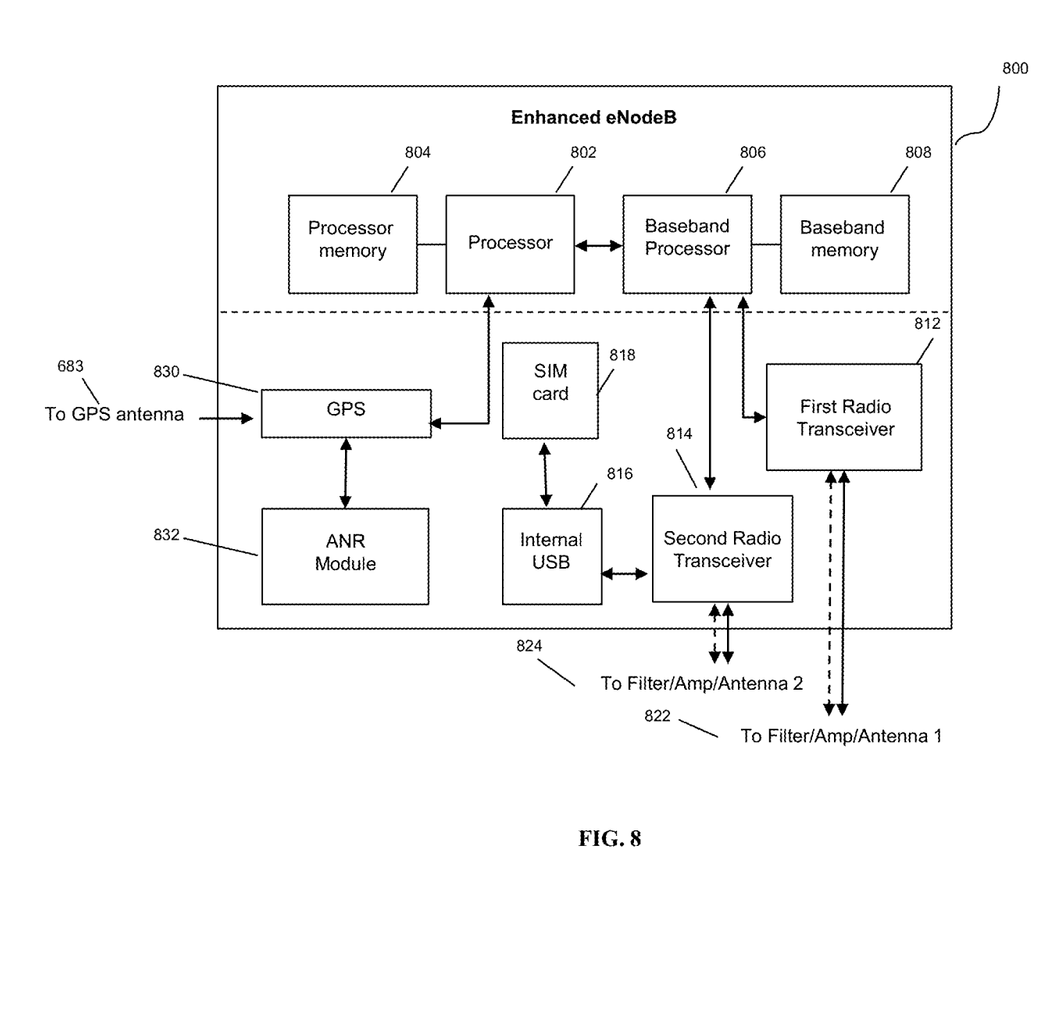
FIG. 8 is an enhanced eNodeB for performing the methods described herein, in accordance with some embodiments.

FIG. 8 is a diagram of an enhanced eNodeB for performing the methods described herein, in accordance with some embodiments. eNodeB 600 may include processor 802, processor memory 804 in communication with the processor, baseband processor 806, and baseband processor memory 808 in communication with the baseband processor. Mesh network node 800 may also include first radio transceiver 812 and second radio transceiver 814, internal universal serial bus (USB) port 816, and subscriber information module card (SIM card) 818 coupled to USB port 816. In some embodiments, the second radio transceiver 814 itself may be coupled to USB port 816, and communications from the baseband processor may be passed through USB port 816. The second radio transceiver may be used for wirelessly backhauling eNodeB 800.

Processor 802 and baseband processor 806 are in communication with one another. Processor 802 may perform routing functions, and may determine if/when a switch in network configuration is needed. Baseband processor 806 may generate and receive radio signals for both radio transceivers 812 and 814, based on instructions from processor 802. In some embodiments, processors 802 and 806 may be on the same physical logic board. In other embodiments, they may be on separate logic boards.

Processor 802 may identify the appropriate network configuration, and may perform routing of packets from one network interface to another accordingly. Processor 802 may use memory 804, in particular to store a routing table to be used for routing packets. Baseband processor 806 may perform operations to generate the radio frequency signals for transmission or retransmission by both transceivers 810 and 812. Baseband processor 806 may also perform operations to decode signals received by transceivers 812 and 814. Baseband processor 806 may use memory 808 to perform these tasks.

The first radio transceiver 812 may be a radio transceiver capable of providing LTE eNodeB functionality, and may be capable of higher power and multi-channel OFDMA. The second radio transceiver 814 may be a radio transceiver capable of providing LTE UE functionality. Both transceivers 812 and 814 may be capable of receiving and transmitting on one or more LTE bands. In some embodiments, either or both of transceivers 812 and 814 may be capable of providing both LTE eNodeB and LTE UE functionality. Transceiver 812 may be coupled to processor 802 via a Peripheral Component Interconnect-Express (PCI-E) bus, and/or via a daughtercard. As transceiver 814 is for providing LTE UE functionality, in effect emulating a user equipment, it may be connected via the same or different PCI-E bus, or by a USB bus, and may also be coupled to SIM card 818. First transceiver 812 may be coupled to first radio frequency (RF) chain (filter, amplifier, antenna) 822, and second transceiver 814 may be coupled to second RF chain (filter, amplifier, antenna) 824.

SIM card 818 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 800 is not an ordinary UE but instead is a special UE for providing backhaul to device 800.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 812 and 814, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 802 for reconfiguration.

A GPS module 830 may also be included, and may be in communication with a GPS antenna 832 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 832 may also be present and may run on processor 802 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 9:
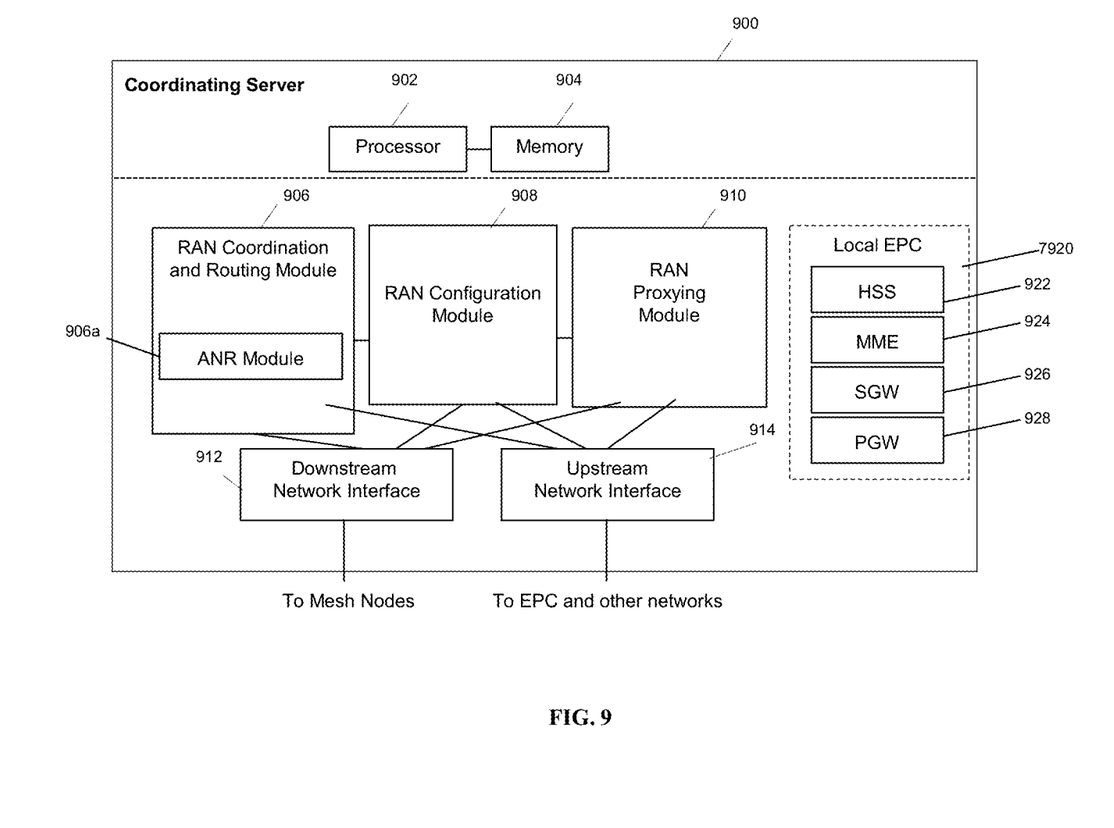
FIG. 9 is a coordinating server for providing services and performing methods as described herein, in accordance with some embodiments.

FIG. 9 is a diagram of a coordinating server for providing services and performing methods as described herein, in accordance with some embodiments. Coordinating server 700 includes processor 902 and memory 904, which are configured to provide the functions described herein. Also present are radio access network coordination/routing (RAN Coordination and routing) module 906, including ANR module 906a, RAN configuration module 908, and RAN proxying module 910. The ANR module 906a may perform the ANR tracking, PCI disambiguation, ECGI requesting, and GPS coalescing and tracking as described herein, in coordination with RAN coordination module 906 (e.g., for requesting ECGIs, etc.). In some embodiments, coordinating server 900 may coordinate multiple RANs using coordination module 906. In some embodiments, coordination server may also provide proxying, routing virtualization and RAN virtualization, via modules 910 and 908. In some embodiments, a downstream network interface 912 is provided for interfacing with the RANs, which may be a radio interface (e.g., LTE), and an upstream network interface 914 is provided for interfacing with the core network, which may be either a radio interface (e.g., LTE) or a wired interface (e.g., Ethernet).

Coordinator 900 includes local evolved packet core (EPC) module 920, for authenticating users, storing and caching priority profile information, and performing other EPC-dependent functions when no backhaul link is available. Local EPC 920 may include local HSS 922, local MME 924, local SGW 926, and local PGW 928, as well as other modules. Local EPC 920 may incorporate these modules as software modules, processes, or containers. Local EPC 920 may alternatively incorporate these modules as a small number of monolithic software processes. Modules 906, 908, 910 and local EPC 920 may each run on processor 902 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 4G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method for providing uplink link adaptation in 5G base stations, comprising:
   computing, by a Physical Layer (PHY), a Received Signal Strength Indicator (RSSI) of each allocation including blocks which are unused;
   computing measurements upon receiving channel allocation and Transmission Power Control (TPC) commands from a Media Access Control (MAC), the measurements including a first factor including a second factor, a third factor and a fourth factor;
   wherein when the fourth factor is greater than a first threshold, then resetting, by the PHY, the TPC commands to be sent to the particular UE and sends a first error message to the MAC;
   wherein when the second factor for at least one allocation is below the threshold, sending, by the PHY, a second error message to the MAC along with the corresponding index of the allocation; and
   upon receiving of the indications from the PHY, adapting, by the MAC, the MCS and power control information for each of the allocations in the next subframe.

2. The method of claim 1 wherein the first factor comprises a revisedWidebandRSSI, wherein the second factor comprises a revisedRSSI(i), wherein the third factor comprises a lowest relative threshold of each allocation, and wherein the fourth factor comprises a revised RSSI of each allocation after applying the TPC commands normalized by the first factor.

3. The method of claim 2 wherein the threshold comprises a widebandRSSIthreshold.

4. The method of claim 3 wherein the first error message comprises a saturation_error_indication message to the MAC, and wherein the second error message comprises a quant_loss_error_indication message.

5. The method of claim 2 wherein computing the revisedWidebandRSSI comprises:

$$revisedWidebandRSSI = \sum_{i=1}^{n} revisedRSSI(i)$$

$$revisedRSSI(i) = measuredRSSI(i) + powerDiff(i)$$

where n is the total number of blocks including the unused blocks, and powerDiff is a function of the TPC commands given by the MAC for a given allocation.

6. The method of claim 2 wherein a Revised RSSI of each allocation after applying the TPC commands normalized by revisedWidebandRSSI comprises:

$$revisedRSSInorm(i) = \frac{revisedRSSI(i)}{revisedWidebandRSSI}$$

7. The method of claim 5 wherein $$widebandRSSIthreshold = a*2^{2(q-1)}$$

where, $\alpha$ is a scale factor between 0.8 to 1
q is the ADC bit width.

* * * * *